United States Patent
Ishino et al.

[11] Patent Number: 5,186,059
[45] Date of Patent: Feb. 16, 1993

[54] TORQUE SENSOR SHAFT

[75] Inventors: Renshiro Ishino, Kobe; Shigeo Yoshimura, Itami; Mutsumi Sunahata, Sakai; Taro Saito, Minamikawachi; Yasuo Tanizaki, Uji, all of Japan

[73] Assignee: Kubota Corporation, Osaka, Japan

[21] Appl. No.: 640,685

[22] Filed: Jan. 14, 1991

[30] Foreign Application Priority Data

Jun. 19, 1990 [JP] Japan .................................. 2-161017

[51] Int. Cl.$^5$ ................................ G01L 3/10
[52] U.S. Cl. ................................ 73/862.193
[58] Field of Search ..................... 73/862.36

[56] References Cited

U.S. PATENT DOCUMENTS 4,760,745  8/1988  Garshelis ...................... 73/862.36
4,933,580  6/1990  Ishino et al. ................ 73/862.36 X

FOREIGN PATENT DOCUMENTS 0130439  5/1990  Japan ........................... 73/862.36

Primary Examiner—Donald O. Woodiel
Attorney, Agent, or Firm—Joseph W. Farley

[57] ABSTRACT

A torque sensor shaft for a non-contacting torque sensor including magnetically anisotropic portions formed on the surface of the shaft. Absolute value of angle of inclination of the anisotropic directions of the magnetically anisotropic portions is set lower than 40 degree so as to permit reduction of stress components in the anisotropic directions from their level in the case where the absolute value of the angle is 45 degree. By such angle setting it is possible to prevent possible decrease in sensor sensitivity and, in addition, to obtain good improvement in the point of magnetic saturation due to torque applied, thereby to obtain an improved dynamic range.

1 Claim, 8 Drawing Sheets

FIG.11

TORQUE SENSOR SHAFT

FIELD OF THE INVENTION

This invention relates to a torque sensor shaft for use in a torque sensor designed to non-contactingly measure a torque on a rotary shaft for transmission of a rotation power generated by an engine, motor or the like.

BACKGROUND OF THE INVENTION

Hitherto, there have been known various non-contacting torque sensors of the type including a torque transmission shaft having formed on its surface a magnetically anisotropic portion comprising machined grooves and/or an amorphous thin magnetic belt, and detection coils disposed around the torque transmission shaft for detecting changes in the magnetic permeability of the magnetically anisotropic portion during torque transmission.

Typically, the torque sensor shaft to which a torque is applied has a pair of magnetically anisotropic portions formed by machining on its surface in the form of grooves or the like. The pair of magnetically anisotropic portions are inclined relative to the axis of the torque sensor shaft so that they are opposite to each other in the direction of magnetic anisotropy and so that their respective angles of inclination are equal to each other in absolute value (which angle of inclination is hereinafter referred to as "inclination angle of magnetic anisotropy"). An excitation coil or coils and detection coils are disposed around each magnetically anisotropic portion.

The inclination angle of magnetic anisotropy is defined to be "± about 45 degree" in most prior publications, for example, in the specification of Japanese Patent No. 169326 and Japanese Patent Application Laid-Open Publication No. 62-185036. In some publications, for example, Japanese Patent Application Laid-Open Publication No. 63-252487, the angle is defined to be "0 to 90 degree", but no particular mention is given as to the ground therefor; as such, this definition is not particularly different in sense from "±45 degree". Insofar as known torque sensors of this type are concerned, therefore, it may be understood that "±45 degree" has been generally accepted as the inclination angle of magnetic anisotropy with respect to the magnetically anisotropic portions.

Usually, when a torque is applied to a torque sensor shaft, principal tensile and compressive stresses act in directions of ±45 degree relative to the axis of the shaft. Therefore, it has been considered that in torque sensors wherein the inclination angle of magnetic anisotropy with respect to the magnetically anisotropic portions is set at ±45 degrees as defined in known publications, directions in which principal stresses act when a torque is applied would coincide with the directions of magnetic anisotropy of the magnetically anisotropic portions so that stresses acting in the directions of magnetic anisotropy would be maximal, whereby most satisfactory detection sensitivity could be obtained.

Generally, however, the magnetic strength of a magneto-strictive material having an Ni content of 1 to 20% which is used for torque sensor shafts of this sort is less strong than its mechanical strength.

The term "magnetic strength" herein refers to a saturation characteristic with respect to stress-magnetism effect (inverse magneto-striction effect). More specifically, in a grooved type torque sensor as described in the specification of Japanese Patent No. 169326, for example, stress concentration occurs in groove bottom portions when a torque is applied, and hysteresis begins to increase with respect to the characteristics of the sensor from a point at which the magnitude of the stress concentration exceeds the strength of weakest crystals (about 10 to 20 kg f/mm$^2$) present in a peripheral area of the groove bottom (including those present depthwise thereof). In this case, the magnitude of the stress by which the hysteresis of the sensor characteristics begins to increase is called magnetic strength. Generally, any magneto-strictive material used for torque sensor shafts is such that when the torque applied has exceeded the magnetic strength of the material, the torque is mechanically still within the elastic limits of the material. In this sense, the magnetic strength of the magneto-strictive material is lower than the mechanical strength thereof.

When torque is applied so that the torque load increases gradually from zero, the hysteresis characteristics and linearity of the sensor begins to become deteriorated under a considerably small stress relative to the mechanical strength of the sensor material and, in turn, a very large hysteresis results until what may be termed a breakdown of the magnetic characteristics has occurred. In the condition in which the magnetic strength is weaker than the mechanical strength in this way, attempts to provide a torque detecting region newly on various conventional shafts would require that almost all of the shafts be made larger in thickness than their existing condition. This is very disadvantageous from an economical point of view.

SUMMARY OF THE INVENTION

Accordingly, it is an object of the invention to provide a torque sensor shaft which eliminates the above mentioned problems and which has high load bearing capacity sufficient to make the sensor shaft less liable to a breakdown of its magnetic characteristics without increasing the diameter of the shaft.

In order to accomplish this object, according to the invention there is provided a sensor shaft for a non-contacting torque sensor including magnetically anisotropic portions formed on the surface of the shaft, wherein the inclination angle of magnetic anisotropy expressed by the absolute value of angle of inclination of the anisotropic directions of said magnetically anisotropic portions relative to the axis of the shaft is lower than 40 degree so as to permit stress components to decrease in said anisotropic directions from their level in the case where said absolute value of angle of inclination is 45 degree.

According to the invention, the absolute value of angle of inclination of the anisotropic directions relative to the axis of the shaft is preferably higher than 10 degree but lower than 35 degree.

In a grooved type torque sensor as described in the specification of Japanese Patent No. 169326, when the inclination angle of magnetic anisotropy is smaller than 45 degree, the direction of a principal stress acting on the shaft under a torque differs from the directions of magnetic anisotropy, with the result that stress components in the directions of magnetic anisotropy are reduced. Accordingly, the sensitivity of the sensor is greatest when the absolute value of the inclination angle of magnetic anisotropy is 45 degree, and the sensitivity is lowered if the absolute value of the inclination angle is larger or smaller than 45 degree. However, in inverse proportion as stress components become smaller in the directions of magnetic anisotropy, the magnitude of torque applicable to the shaft to the extent of magnetic saturation can be increased, so that the dynamic range of the sensor (a range of stresses that insures the linearity and hysteresis characteristics of the sensor) is improved.

Such improvement in the characteristics of the sensor is particularly significant when the inclination angle of magnetic anisotropy is greater than 15 degree but smaller than 30 degree.

DESCRIPTION OF EMBODIMENTS

Figure 1:
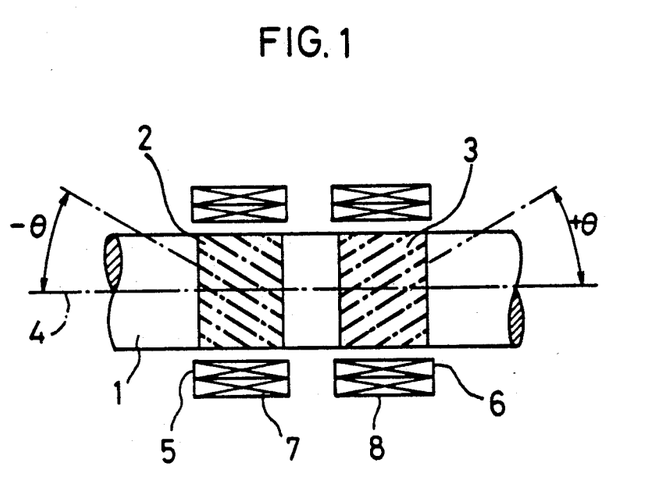
FIG. 1 is a schematic block diagram showing a magneto-strictive torque sensor in which is employed a torque sensor shaft representing one embodiment of the invention.

Referring to FIG. 1, there is shown a torque sensor shaft 1 having magnetically anisotropic portions 2, 3 formed therein. In the magnetically anisotropic portions 2, 3, inclination angles $+\theta$, $-\theta$ of, magnetic anisotropy are set lower than 40 degree, for example, 30 degree or 15 degree. Numerals 5, 6 designate excitation coils, and numerals 7, 8 designate detection coils.

Figure 2:
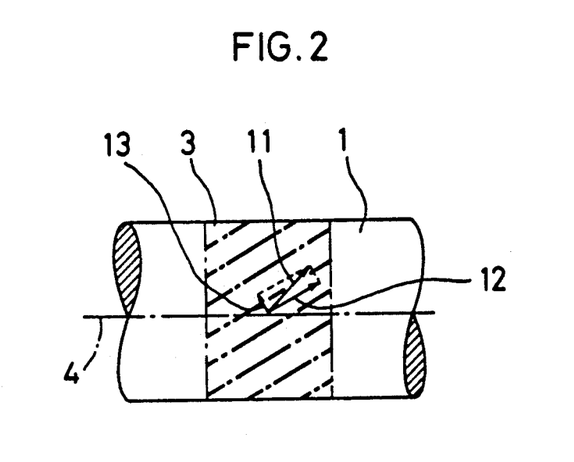
FIG. 2 is a view showing a principal stress acting on the torque sensor shaft in FIG. 1.

When a torque is applied to the sensor shaft 1, a principal stress 11 acts at an angle of 45 degree relative to the axis 4 of the torque sensor shaft 1. Where the principal stress 11 is analyzed into a stress component 12 oriented in the direction of inclination of magnetic anisotropy and a stress component 13 oriented in a direction perpendicular to the direction of inclination of magnetic anisotropy, the stress component 12 becomes smaller as the inclination angle $+\theta$ of magnetic anisotropy of the magnetically anisotropic portion 3 becomes smaller than 45 degree. Accordingly, the sensor sensitivity based on the magnitude of stress in the directions of magnetic anisotropy of the magnetically anisotropic portions 2, 3 is reduced by decreasing the absolute values of the inclination angles $+\theta$, $-\theta$.

However, as FIG. 2 shows, the stress component in the direction of magnetic anisotropy of the magentically anisotropic portion 3 becomes smaller, and accordingly the magnitude of the torque applicable to the shaft 1 to the extent of magnetic saturation can be increased over that in the case where the angle is 45 degree. As a result, the point of magnetic saturation due to the torque is raised and thus the dynamic range of the sensor is improved. Conversely, where the magnitude of the torque applied to the shaft 1 does not exceed a predetermined value, the diameter of the shaft 1 can be reduced inasmuch as the mechanical strength requirement is satisfied, it being thus possible to obtain good economical advantage.

EXPERIMENTAL EXAMPLES

Figure 3A:
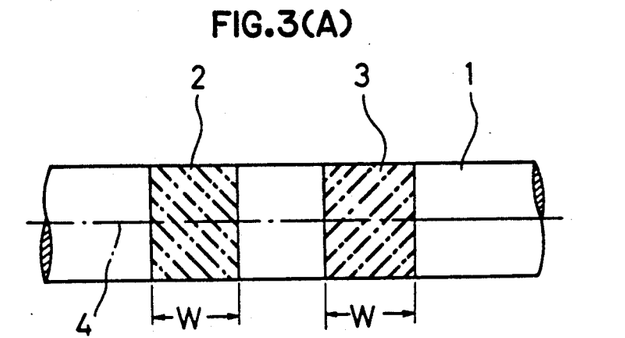
FIG. 3A is a view showing breadth of the magnetically anisotropic portions of the torque sensor shaft.
Figure 3B:
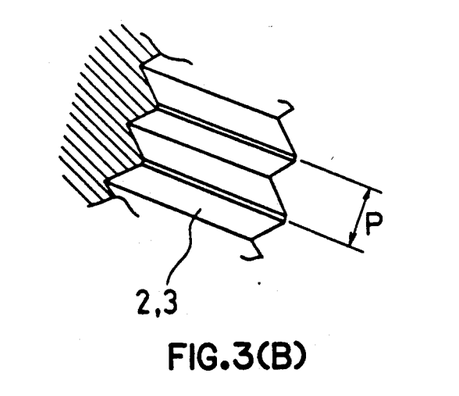
FIG. 3B is a view showing the pitch of the grooves of the magnetically anisotropic portions.
Figure 4:
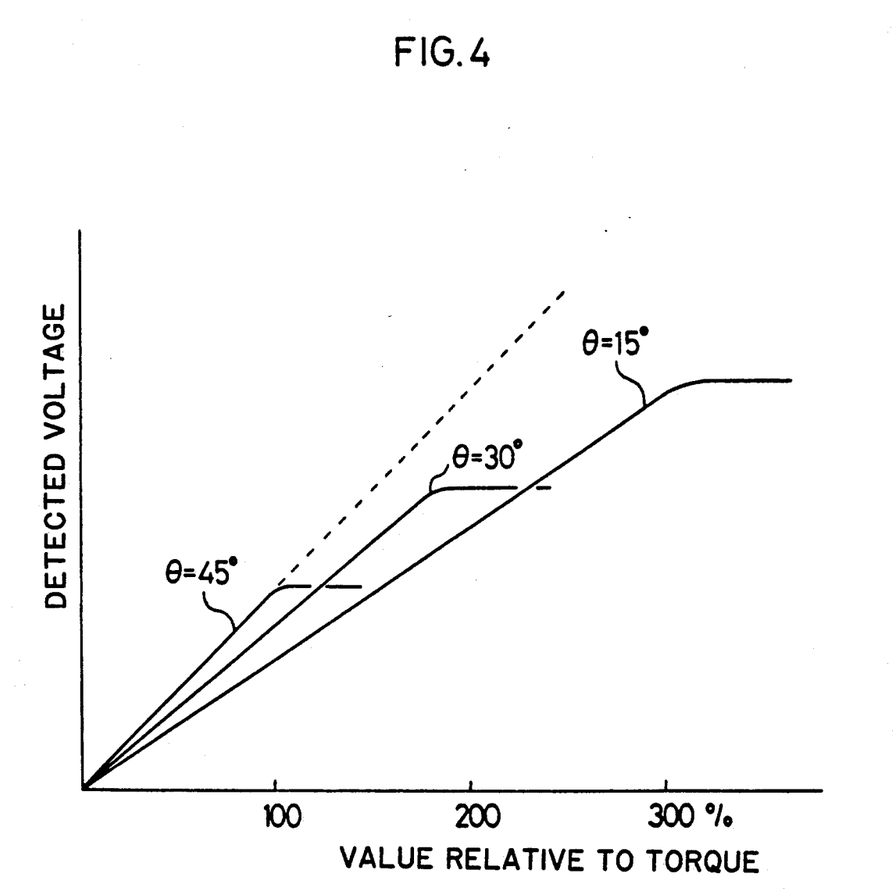
FIGS. 4 to 7, and 10 and 11 are graphical representations showing results of examples according to the invention.

FIG. 4 shows measurement results with respect to torque vis-a-vis detected voltage characteristics of shafts 1 of same material (SNCM 815, JIS) and same diameter wherein inclination angles $+\theta$, $-\theta$ of magnetic anisotropy relative to shaft axis 4 of their magnetically anisotropic portions 2, 3 are set at $\pm 45$, $\pm 30$, and $\pm 15$ respectively, the magnetically anisotropic portions 2, 3 being in the form of rolled grooves having same width W and same groove pitch P as shown in FIG. 3. Each detected voltage value was measured on the basis of a difference between detection signals from two detection coils 7, 8. As shown, where the case of inclination angles $+\theta$, $-\theta$ of magnetic anisotropy being 45 degree was taken as 100%, relative magnitude values of torque loads at which magnetic saturation occurred were about 200% in the case of 30 degree, and about 300% in the case of 15 degree.

As FIG. 4 shows, as absolute values of inclination angles $+\theta$, $-\theta$ of magnetic anisotropy were reduced, the value of detected voltage at same torque value, or detection sensitivity was gradually decreased. This is based on the same reason that has been explained with respect to FIG. 2.

Figure 5:
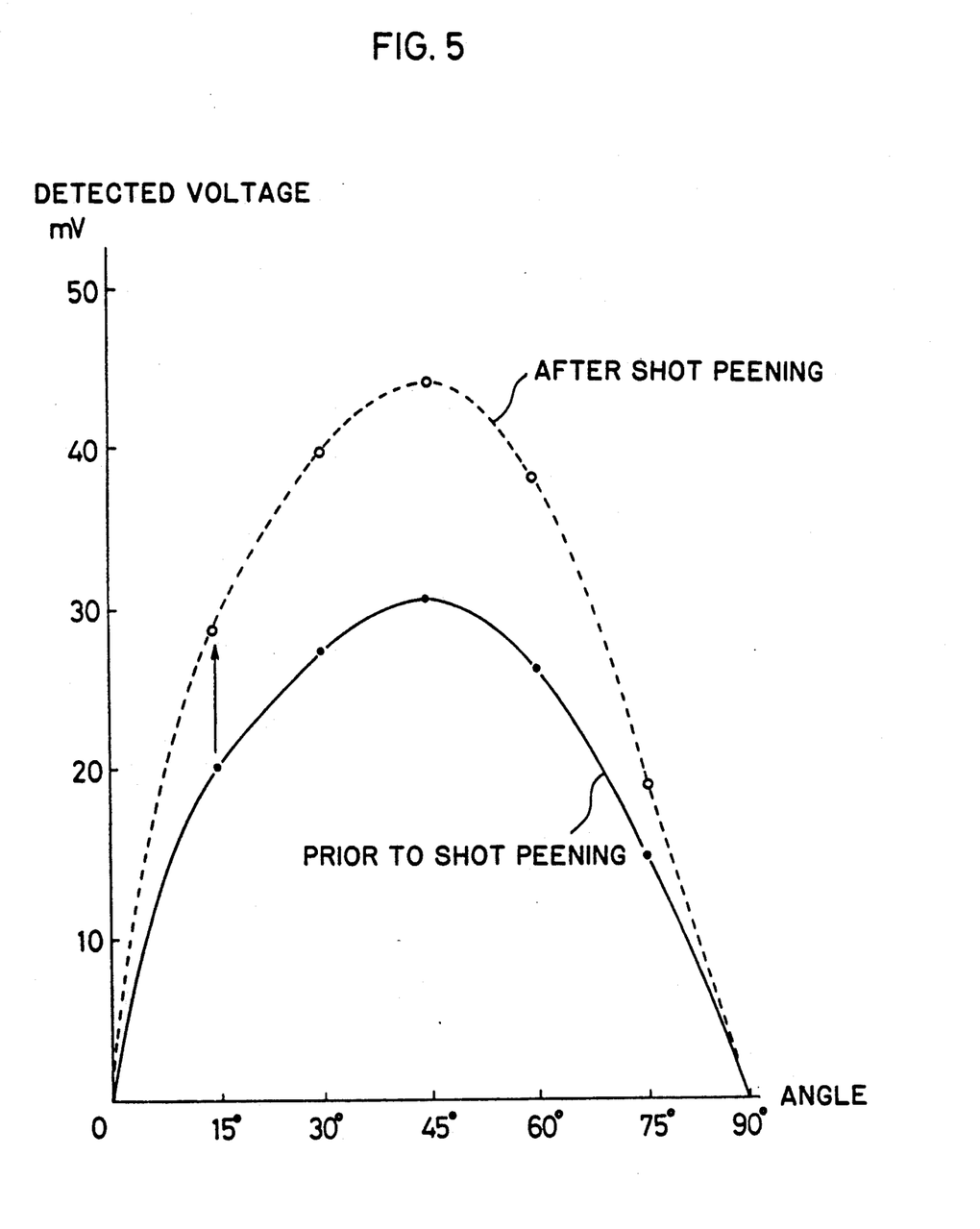

FIG. 5 shows changes in sensitivity observed when the inclination angle of magnetic anisotropy was varied. In this case, with a view to obtaining high load bearing capability in particular, each shaft made of the earlier mentioned material, SNCM 815, JIS, was formed with magnetically anisotropic portions 2, 3 by rolling, which was then carburized and subjected further to high frequency hardening, and tempering, and finally to shot peening on the shaft surface.

In FIG. 5, solid line shows measurement results with respect to shafts which were carburized, then subjected to high frequency hardening and tempering, but not yet subjected to shot peening, under a rated torque (of about 10 kg/mm$^2$ in terms of average stress on shaft surface). In this case, measurements were made with respect to cases in which absolute values of inclination angles $+\theta$, $-\theta$ of magnetic anisotropy were 15 degree, 30 degree, 45 degree, 60 degree, and 75 degree.

In FIG. 5, broken line shows measurement results after the shafts were subjected to same heat treatment and also to shot peening. As shown, it was found that shot peening resulted in significant improvement in detection sensitivity, thus enabling the shaft to be satisfactorily put in practical use even when the absolute value of the inclination angle of magnetic anisotropy was about 15 degree. It is noted that no appreciable improvement in sensitivity was observed when the absolute value of the angle was 75 degree. The reason for such improvement in sensitivity by shot peening may be that the distribution of residual stresses is changed by shot peening so that considerable change occurs in the magnitude of magnetic anisotropy of the magnetically anisotropic portions, which leads to improved sensitivity.

Shot peening for improvement of sensor characteristics was previously proposed by the present inventors in Japanese Patent Application Laid-Open Publication No. 62-328882 and Japanese Patent Application No. 1-42544, and such shot peening is not within the scope of the present invention. Therefore, details as to shot peening are not discussed herein.

Figure 6:
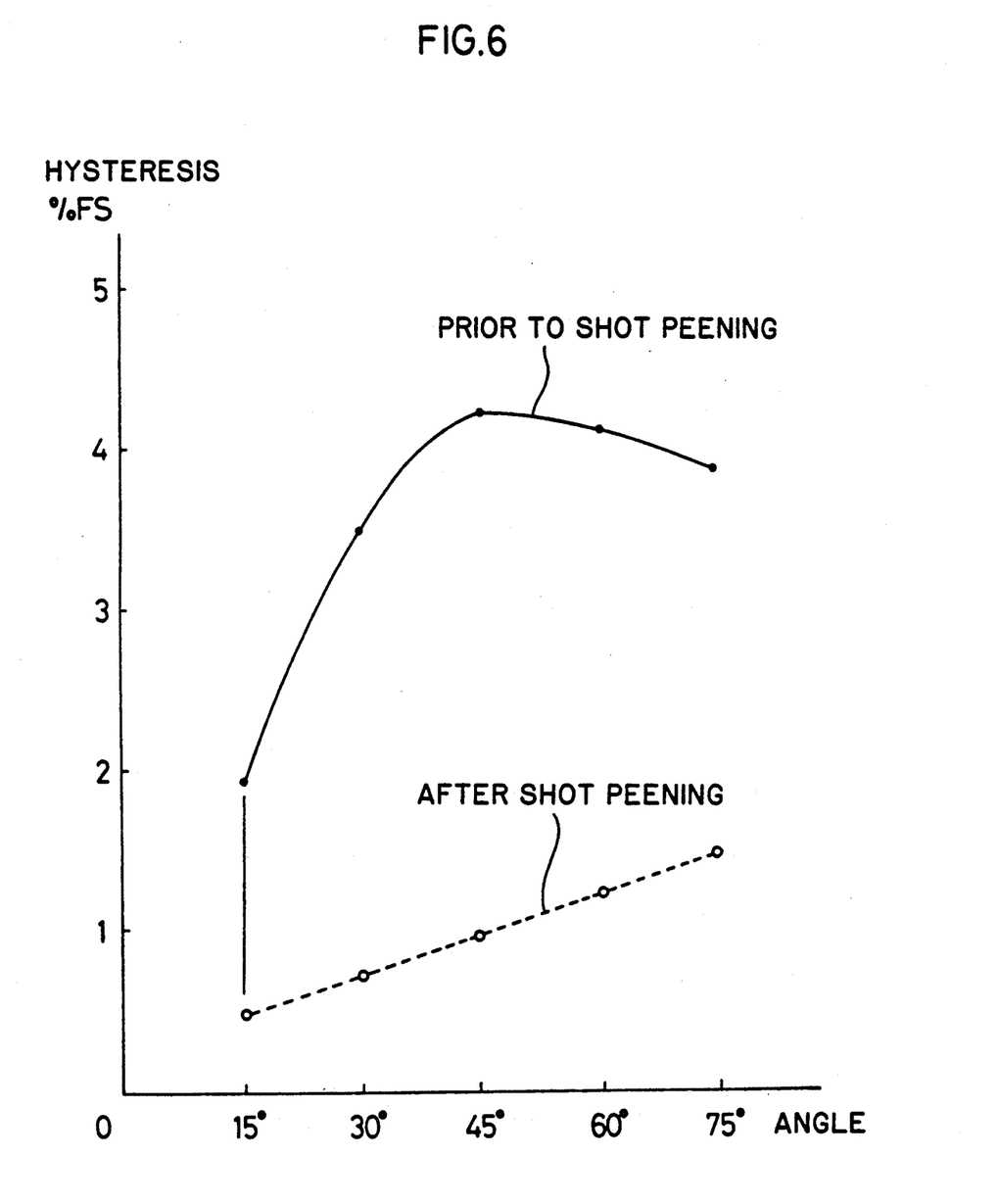

FIG. 6 gives absolute values of hystereses with respect to detection outputs observed when a rated torque is applied to the shafts 1, in percentage of detected values to the rated output. Solid line represents data prior to shot peening, and broken line represents data after shot peening. Even prior to shot peening, comparatively good hysteresis characteristics were observed when the absolute values of inclination angles $+\theta$, $-\theta$ of magnetic anisotropy were 15 to 30 degree; but as a result of shot peening, considerable improvement was observed in hysteresis characteristics.

Figure 7:
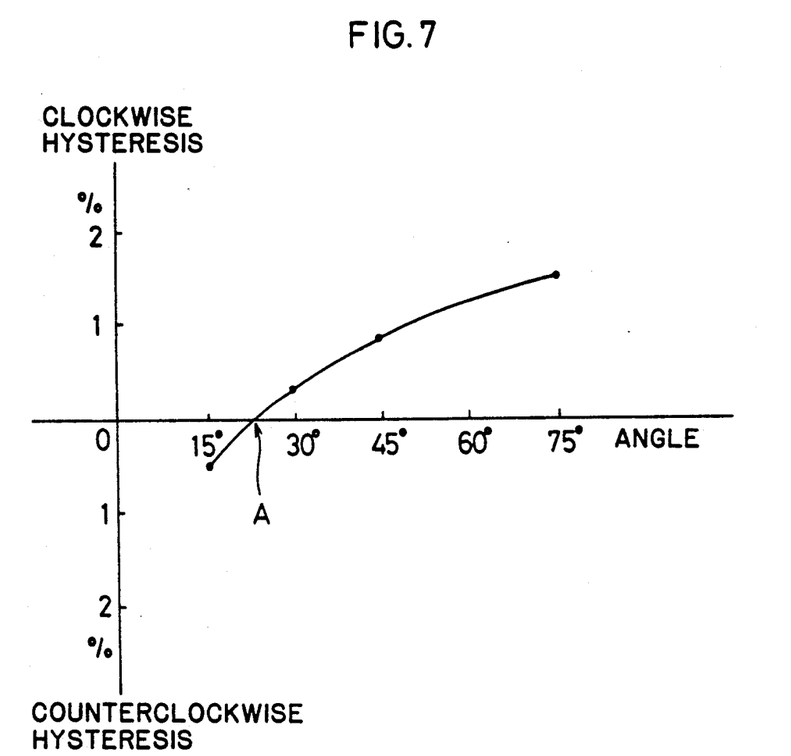
Figure 8:
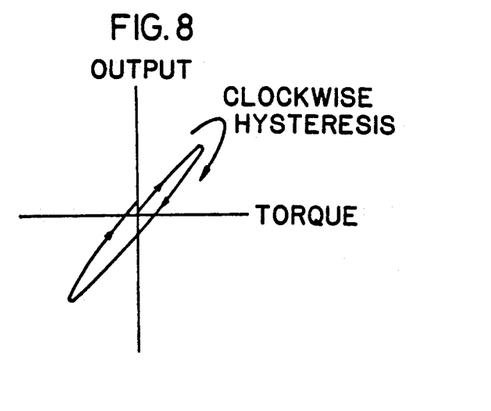
FIGS. 8 and 9 are explanatory views illustrating clockwise and counterclockwise hystreses.
Figure 9:
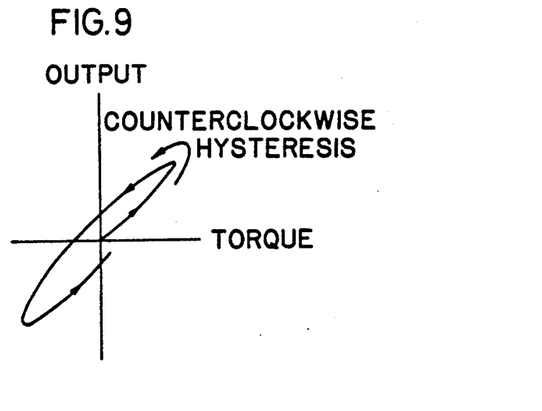

Hysteresis of a detection output observed when torque is applied to each shaft 1 comprises, in reality, a clockwise hysteresis as shown in FIG. 8 and a counterclockwise hysteresis as shown in FIG. 9. In FIG. 6, the direction of hysteresis is disregarded and only the magnitude of hysteresis is considered. In FIG. 7, measurement results plotted with the direction of hysteresis taken into consideration are shown. The data in FIG. 7 correspond to the data after shot peening in FIG. 6. It can be observed that as the inclination angle of magnetic anisotropy is reduced, clockwise hysteresis becomes smaller and, counterclockwise hysteresis occurs when the inclination angle of magnetic anisotropy is 15 degree.

An angle A at which the hysteresis is minimal should exist between 30 degree and 15 degree, and it can be understood therefore that the absolute value of the inclination angle of magnetic anisotropy should preferably be within an angle range of 15 degree to 30 degree in order to obtain improved hysteresis characteristics. If the absolute value of the inclination angle of magnetic anisotropy exceeds 45 degree, there will be degradation in hysteresis characteristics.

Especially when absolute value of inclination angles $+\theta$, $-\theta$ of magnetic anisotropy is 15 to 30 degree, considerable improvement can be obtained in hysteresis characteristics by shot peening the magnetically anisotropic portions 2, 3. In addition, shot peening results in improved sensitivity, it being possible to obtain a sensitivity equal to or greater than that obtainable when, prior to shot peening, the inclination angle of magnetic anisotropy is 45 degree at which a maximum sensitivity can be obtained. In other words, as compared with the sensor characteristics observed when the inclination angle of magnetic anisotropy prior to shot peening is 45 degree, the sensor characteristics obtainable after shot peening and when the inclination angle of magnetic anisotropy is 15 to 30 degree are such that the hysteresis characteristics are greatly improved and, in addition, the sensitivity characteristics obtainable are of same level or even greater, in which respect peening provides considerable industrial advantage.

Figure 10:
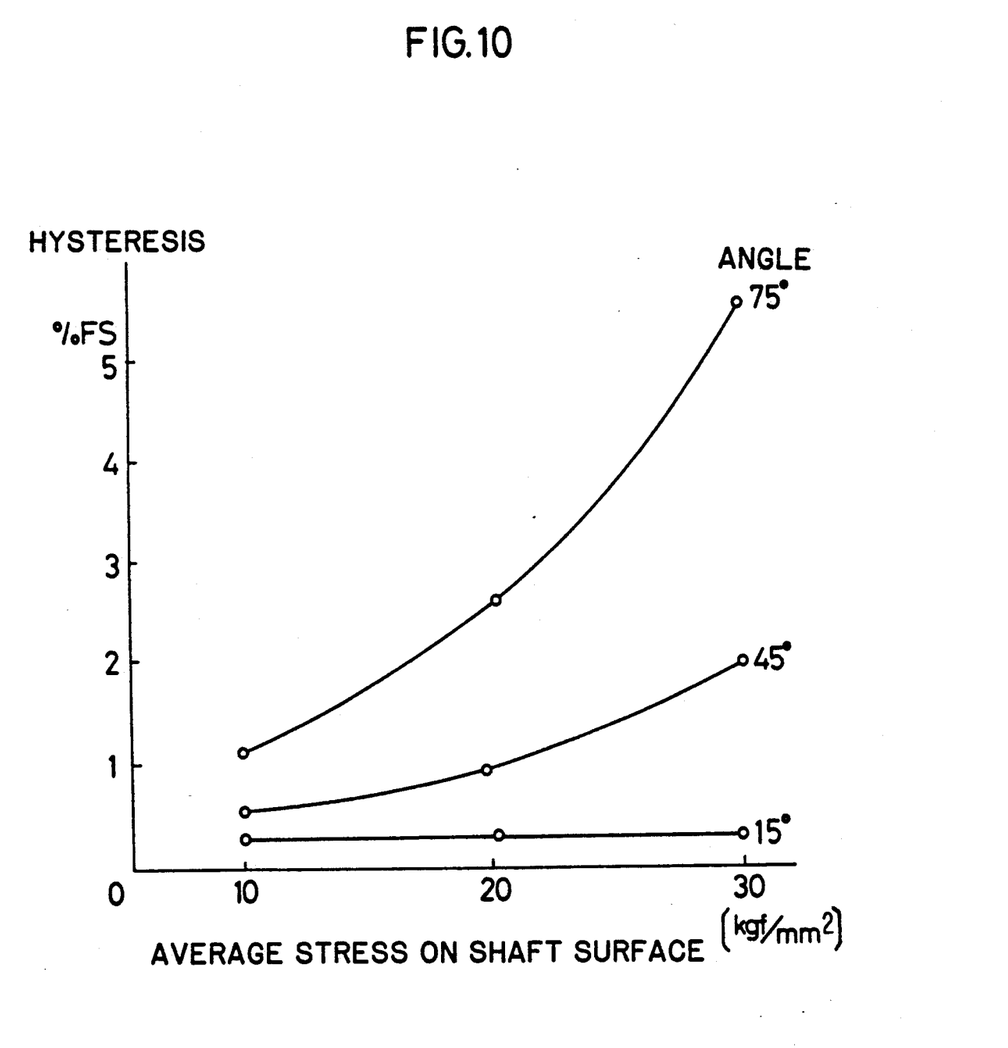

FIG. 10 shows hysteresis characteristics observed when a rated torque (about 10 kg f/mm$^2$ in terms of average stress on sensor shaft surface) and overtorque are applied. When the inclination angle of magnetic anisotropy was 75 degree, substantial deterioration was observed in hysteresis characteristics in proportion as the torque applied became greater. Conversely, when the inclination angle of magnetic anisotropy was 15 degree, little increase in hysteresis was observed even if large torque was applied, and thus very satisfactory overload characteristics were obtained. When the rated torque was applied, more satisfactory hysteresis characteristics were observed in the case of inclination angle of 15 degree, as is the case with FIGS. 6 and 7 observations.

Figure 11:
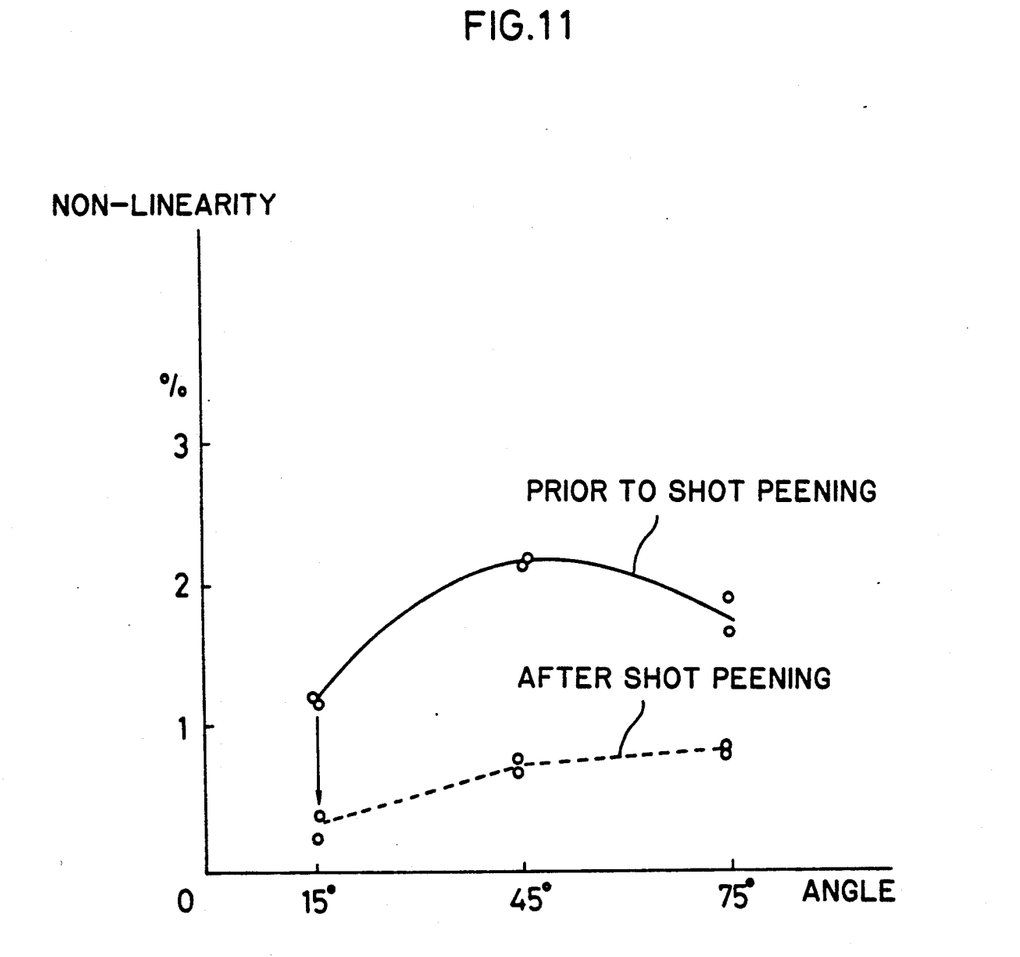

FIG. 11 shows results of measurements made before and after shot peening, with respect to non-linearity of detection outputs. In this case too, more satisfactory characteristics were obtained in proportion as the inclination angle of anisotropy became smaller.

What is claimed is:

1. A torque sensor shaft for a non-contacting torque sensor including magnetically anisotropic portions formed on the surface of the shaft, wherein said magnetically anisotropic portions are in the form of machined grooves and wherein the inclination angle of magnetic anisotropy expressed by the absolute value of the angle of inclination of the anisotropic directions of said magnetically anisotropic portions relative to the axis of the shaft is higher than 15 degrees but lower than 30 degrees, whereby the hysteresis characteristics of the sensor, both clockwise hysteresis and counterclockwise hysteresis, become minimal.

* * * * *

UNITED STATES PATENT AND TRADEMARK OFFICE
CERTIFICATE OF CORRECTION

PATENT NO. : 5,186,059
DATED : February 16, 1993
INVENTOR(S) : Renshiro Ishino et al.

It is certified that error appears in the above-identified patent and that said Letters Patent is hereby corrected as shown below:

Column 1, line 37, "62-185036" should read --62-185136--

Column 3, line 29, "hystreses" should read --hystereses--

Column 3, line 35, remove "," after --of--

Signed and Sealed this

Ninth Day of November, 1993

Attest:

BRUCE LEHMAN

*Attesting Officer*  *Commissioner of Patents and Trademarks*